(12) United States Patent
Suzuki et al.

(10) Patent No.: US 7,496,186 B2
(45) Date of Patent: Feb. 24, 2009

(54) OUTSIDE-LAN CONNECTABLE IP KEY TELEPHONE SYSTEM, TERMINAL UNIT THEREOF, MAIN UNIT THEREOF, AND OUTSIDE-LAN CONNECTING METHOD

(75) Inventors: Yumiko Suzuki, Kawasaki (JP); Yoshikazu Kobayashi, Kawasaki (JP)

(73) Assignee: NEC Infrontia Corporation, Kawasaki-Shi (JP)

( * ) Notice: Subject to any disclaimer, the term of this patent is extended or adjusted under 35 U.S.C. 154(b) by 797 days.

(21) Appl. No.: 10/724,708

(22) Filed: Dec. 2, 2003

(65) Prior Publication Data
US 2004/0109461 A1 Jun. 10, 2004

(30) Foreign Application Priority Data
Dec. 2, 2002 (JP) ............................. 2002-350065

(51) Int. Cl.
*H04M 1/00* (2006.01)
*H04L 12/28* (2006.01)
*H04L 12/56* (2006.01)
(52) U.S. Cl. ..................... 379/156; 379/157; 370/420
(58) Field of Classification Search ......... 370/400–404, 370/419, 420; 379/156, 157
See application file for complete search history.

(56) References Cited

U.S. PATENT DOCUMENTS

| 5,684,869 | A * | 11/1997 | Palumbo et al. | ............. 379/182 |
| 6,614,781 | B1 * | 9/2003 | Elliott et al. | ................. 370/352 |
| 6,970,915 | B1 * | 11/2005 | Partovi et al. | ................ 709/217 |
| 2003/0095542 | A1 * | 5/2003 | Chang et al. | ................ 370/352 |
| 2003/0223566 | A1 * | 12/2003 | Book et al. | ................ 379/219 |
| 2003/0235182 | A1 * | 12/2003 | McMullin | ................. 370/352 |
| 2004/0004968 | A1 * | 1/2004 | Nassar | ....................... 370/401 |
| 2004/0006557 | A1 * | 1/2004 | Baker et al. | ...................... 707/3 |
| 2004/0161095 | A1 * | 8/2004 | Kredo et al. | ................ 379/258 |
| 2007/0201653 | A1 * | 8/2007 | Tsukamoto | ............ 379/142.06 |

FOREIGN PATENT DOCUMENTS

| JP | 62-248351 | 10/1987 |
| JP | 6-291850 | 10/1994 |
| JP | 7-245657 | 9/1995 |
| JP | 9-116940 | 5/1997 |
| JP | 10-243105 | 9/1998 |

(Continued)

*Primary Examiner*—Seema S Rao
*Assistant Examiner*—Xavier Szewai Wong
(74) *Attorney, Agent, or Firm*—Young & Thompson

(57) ABSTRACT

A main unit of a key telephone system accommodates a plurality of terminal units of the key telephone system that use a LAN within company as extension lines and exchange calls with outside lines. The main unit of the key telephone system has a function as an IP server for the terminal units and stores and manages a database of information in a storing device. A terminal unit of the system accesses an IP address of the main unit of the key telephone system, and logs in to the main unit with predetermined first ID and password. The main unit of the key telephone system authenticates the first ID and password and registers the terminal unit of the key telephone system as an IP extension terminal unit, and allows the KTS terminal unit to voice communicate with another terminal unit of the key telephone system in accordance with the VoIP.

6 Claims, 17 Drawing Sheets

FOREIGN PATENT DOCUMENTS

| | | |
|---|---|---|
| JP | 2000-209343 | 7/2000 |
| JP | 2001-331389 | 11/2001 |
| JP | 2002-077403 | 3/2002 |
| JP | 3327918 B * | 7/2002 |
| WO | WO 01/78317 | 10/2001 |
| WO | WO 01/78317 A1 * | 10/2001 |

* cited by examiner

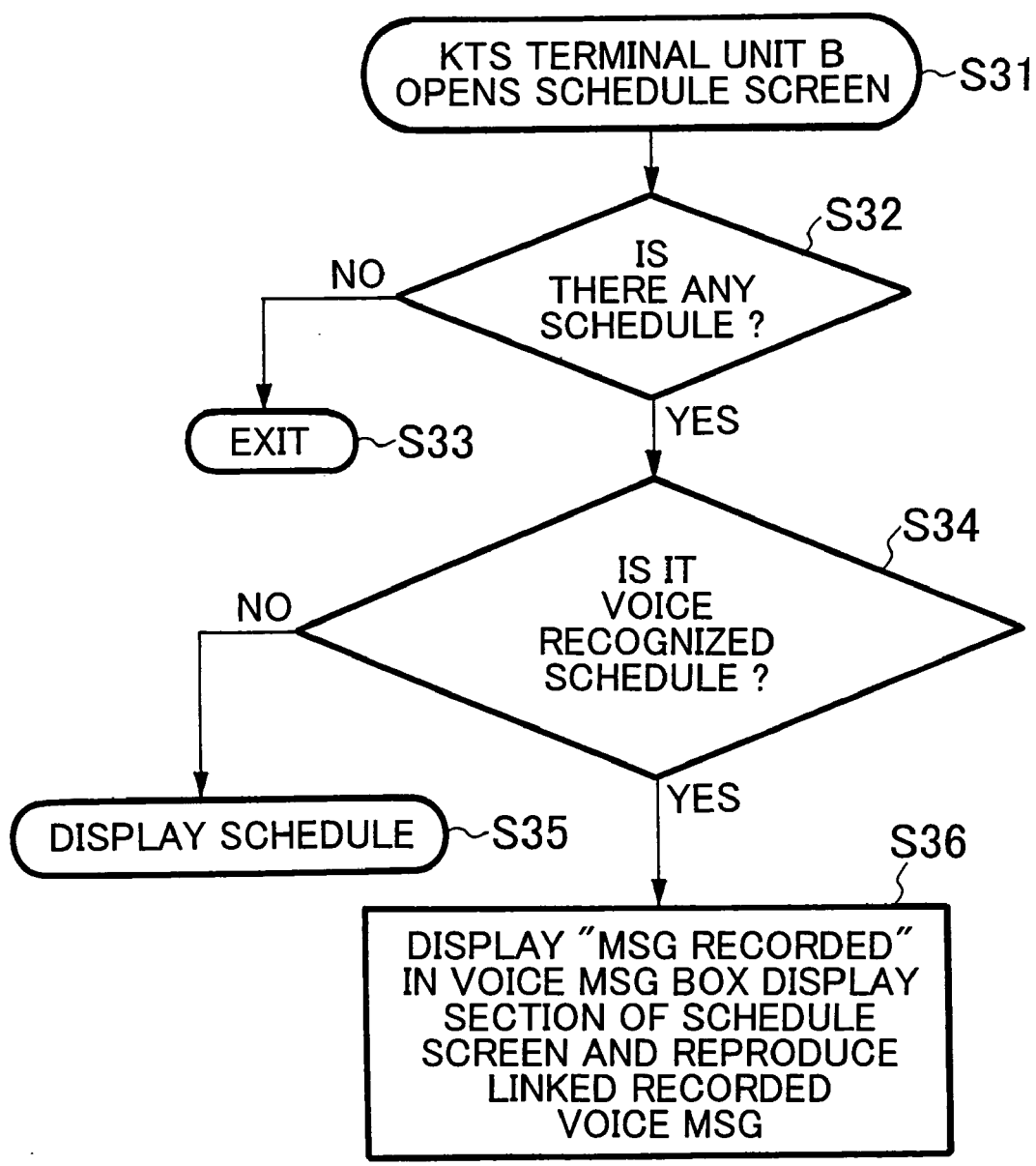

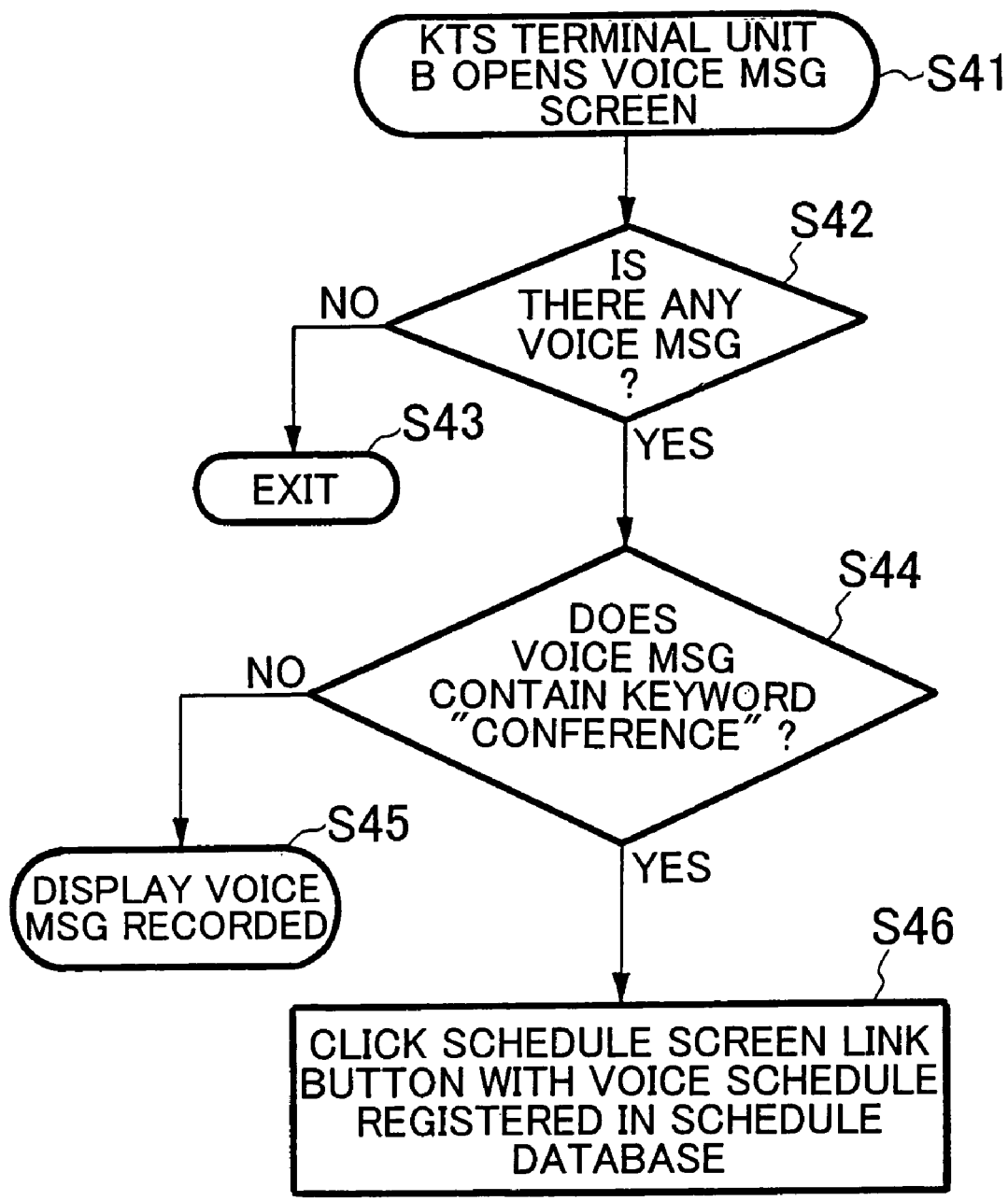

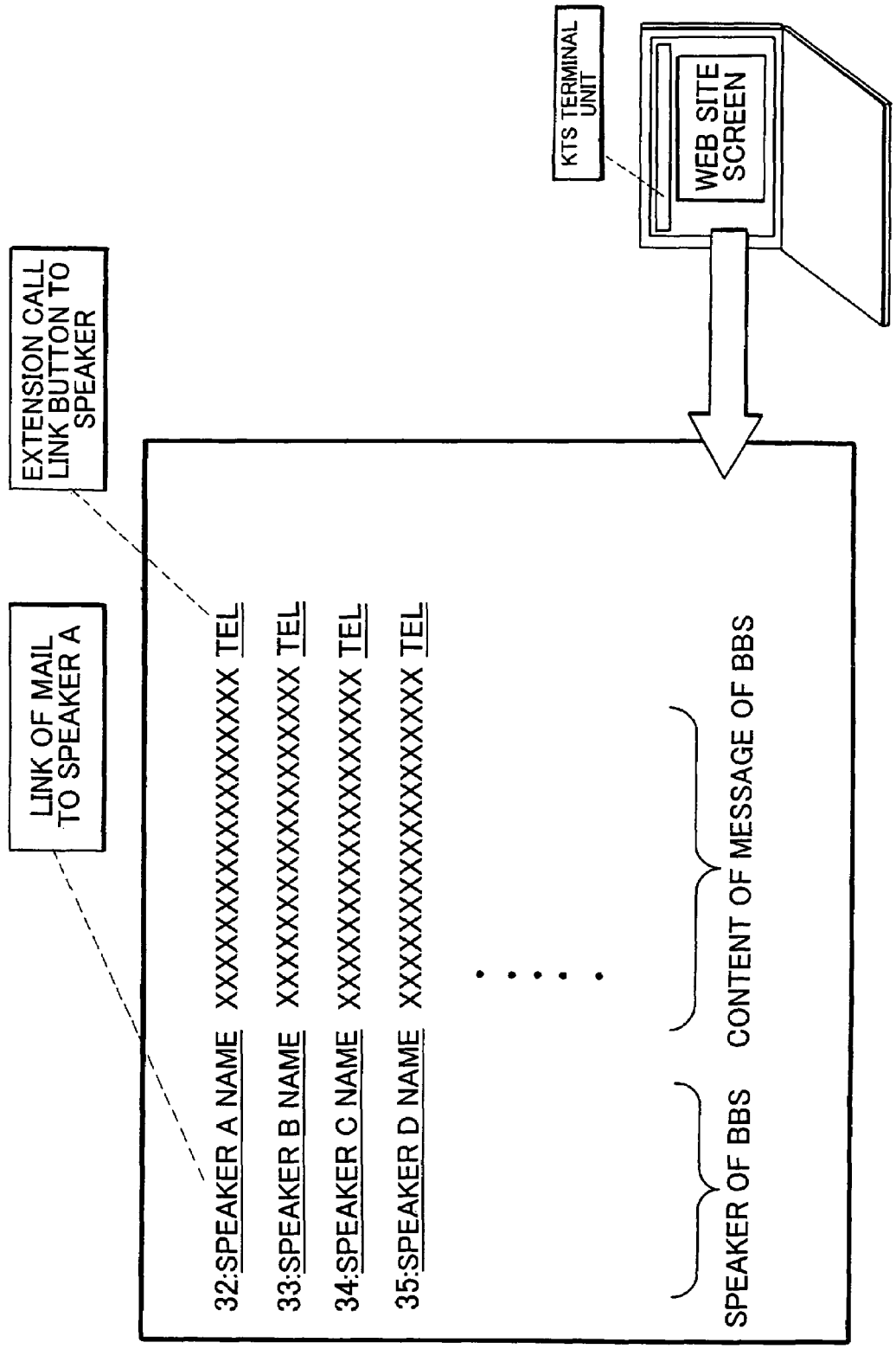

OUTSIDE-LAN CONNECTABLE IP KEY TELEPHONE SYSTEM, TERMINAL UNIT THEREOF, MAIN UNIT THEREOF, AND OUTSIDE-LAN CONNECTING METHOD

BACKGROUND OF THE INVENTION

1. Field of the Invention

The present invention relates to an Internet Protocol (IP) key telephone system that allows a terminal unit placed outside a Local Area Network (LAN) within company to be connected to a main unit of the key telephone system.

2. Description of the Related Art

As a telephone system used in a small office, a key telephone system that accommodates a plurality of extension terminal units and switches them with outside lines is known. In addition, an IP key telephone system that uses extension lines of the key telephone system as IP telephone system units through a LAN within company is known. A main unit of the key telephone system accommodates a plurality of IP extension terminal units and switches them with outside lines. In addition, the main unit has a function as an IP server and stores and manages a database of various kinds of information.

However, a terminal unit placed outside the LAN within company cannot access the IP key telephone system and retrieve information from the main unit of the IP key telephone system.

SUMMARY OF THE INVENTION

Therefore, an object of the present invention is to provide an outside-LAN connectable IP key telephone system, a terminal unit thereof, a main unit thereof, and a outside-LAN connecting method that allow the terminal unit placed outside a company or office to access the main unit through an IP network and to use services and information that the main unit supports as if the terminal unit were placed in the company or office.

To solve the foregoing problem, the present invention is an outside-LAN (Local Area Network) connectable IP (Internet Protocol) key telephone system, comprising a key telephone system main unit, configured to accommodate a plurality of IP extension terminal units, for switching calls with outside lines; and a key telephone system terminal unit, disposed outside the LAN, for accessing the key telephone system main unit through an IP network and for functioning as an IP extension terminal unit, wherein the key telephone system terminal unit comprises log-in means for logging in to an IP address of the key telephone system main unit with predetermined first ID and password, and wherein the key telephone system main unit comprises IP extension terminal unit registering means for authenticating the first ID and password received from the key telephone system terminal unit, registering the key telephone system terminal unit as an IP extension terminal unit, and allowing the key telephone system terminal unit to voice communicate with another key telephone system terminal unit in accordance with the Voice over Internet Protocol (VoIP).

The key telephone system terminal unit registered as an IP extension terminal unit with the key telephone system main unit comprises log-on means for logging on to the key telephone system main unit with predetermined second ID and password, and portal site displaying means for displaying a portal site for accessing information stored in a database of the key telephone system main unit, when the log-on means has logged on to the key telephone system terminal unit. The key telephone system main unit further comprises information access permitting means for authenticating the second ID and password received from the key telephone system terminal unit and permitting the key telephone system terminal unit to access information stored in the database.

In the foregoing structure, the terminal unit of the key telephone system placed outside of the LAN can access the main unit of the key telephone system through the IP network and use information stored in the database of the main unit.

These and other objects, features and advantages of the present invention will become more apparent in light of the following detailed description of preferred embodiments thereof, as illustrated in the accompanying drawings.

BRIEF DESCRIPTION OF DRAWINGS

FIG. 10 is a schematic diagram showing an example of a display screen of a portal site log-on.

FIG. 15 is a flow chart in the case that the KTS terminal unit (B) placed inside the LAN opens a schedule screen.

FIG. 16 is a flow chart in the case that the KTS terminal unit (B) placed inside the LAN opens a voice message screen.

FIG. 17 is a schematic diagram showing an example of a display of an electronic bulletin board.

DESCRIPTION OF PREFERRED EMBODIMENTS

Next, with reference to the accompanying drawings, an embodiment of the present invention will be described.

Figure 1:
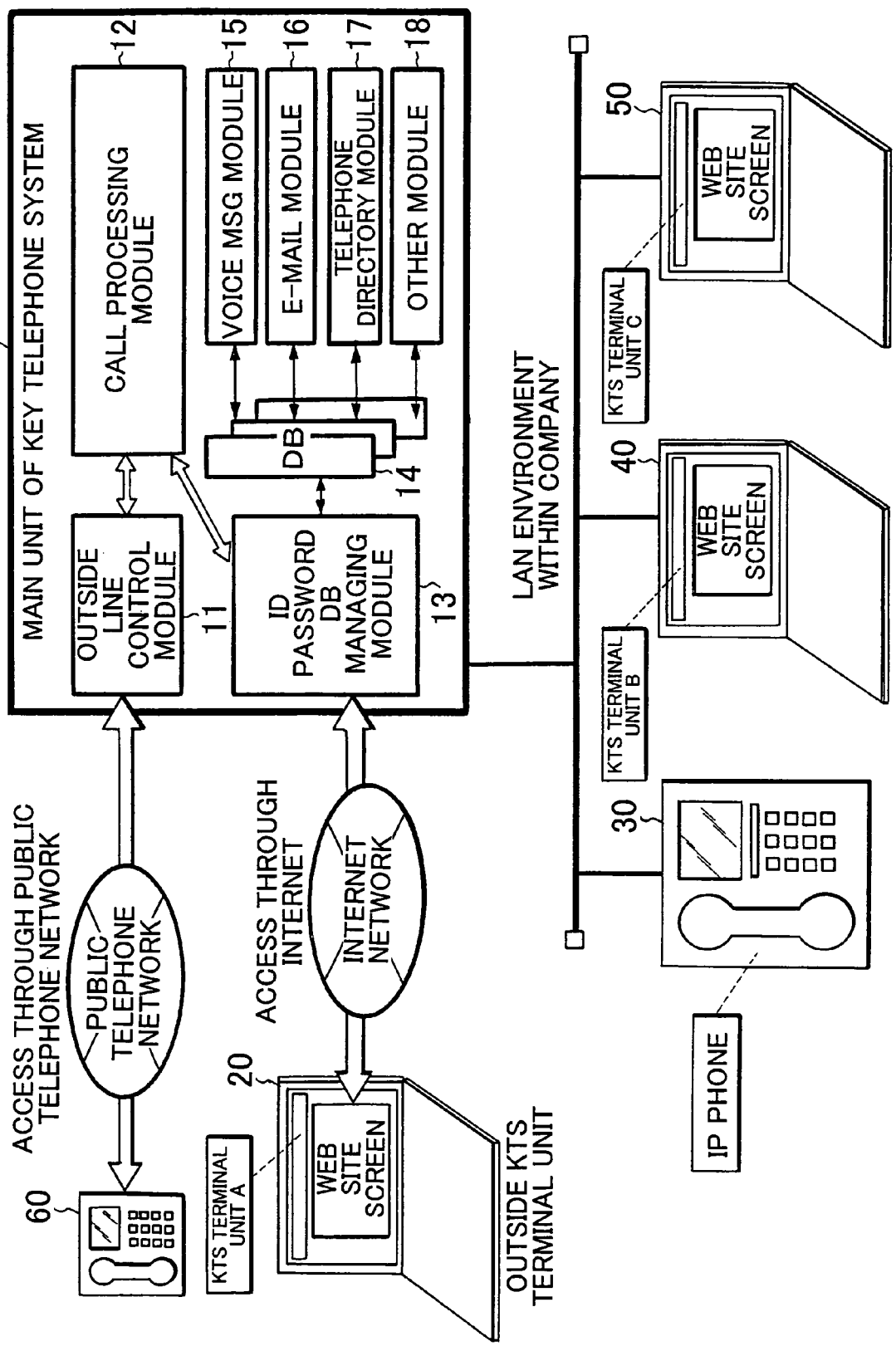
FIG. 1 is a schematic diagram showing a structure of an outside-LAN connectable IP key telephone system according to the present invention.

FIG. 1 shows a structure of an outside-LAN connectable IP key telephone system of the present invention. A main unit 10 of the key telephone system uses a LAN (or intranet) within company as extension lines, accommodates a plurality of IP extension terminal units that are an IP phone terminal unit 30 and terminal units 40 and 50 of the key telephone system (hereinafter referred to as KTS terminal units), and switches them with outside lines. As a call processing protocol, the Media Gateway Control (MEGACO) protocol is used. In addition, the main unit 10 has a function of an IP server and stores a database of text, image information, and so forth in a storing device (hard disk or the like). The database has a telephone directory of users of the extension terminal units. Presence information that represents which users of the extension terminal units can communicate with others is added to the database.

An outside line control module 11 transmits and receives a call to and from an outside telephone set 60 through a public telephone network. An ID—password managing module 13 performs a connecting process for an access from an external terminal unit through the IP network (Internet) and performs a connecting process for the access to the main unit 10. A call processing module 12 switches an outside telephone call through the public network and a voice communication in accordance with the Voice over Internet Protocol (VoIP) through the IP network to IP extension terminal units connected to the LAN within company. A database 14 stores various kinds of information including voice messages, electronic mail, and telephone directory data. A voice message processing module 15, an electronic mail processing module 16, a telephone directory processing module 17, and other processing module 18 (control programs) process the respective information stored in the database 14.

The KTS terminal units 20, 40, and 50 are personal computers in which software that causes them to accomplish a function of an IP extension terminal unit. The KTS terminal units 20, 40, and 50 can perform voice communications with each other in accordance with the VOIP through the LAN within company, access the main unit 10 of the key telephone system, and transmit and receive as IP clients information such as text, image to and from the database of the main unit 10 of the key telephone system.

Figure 2:
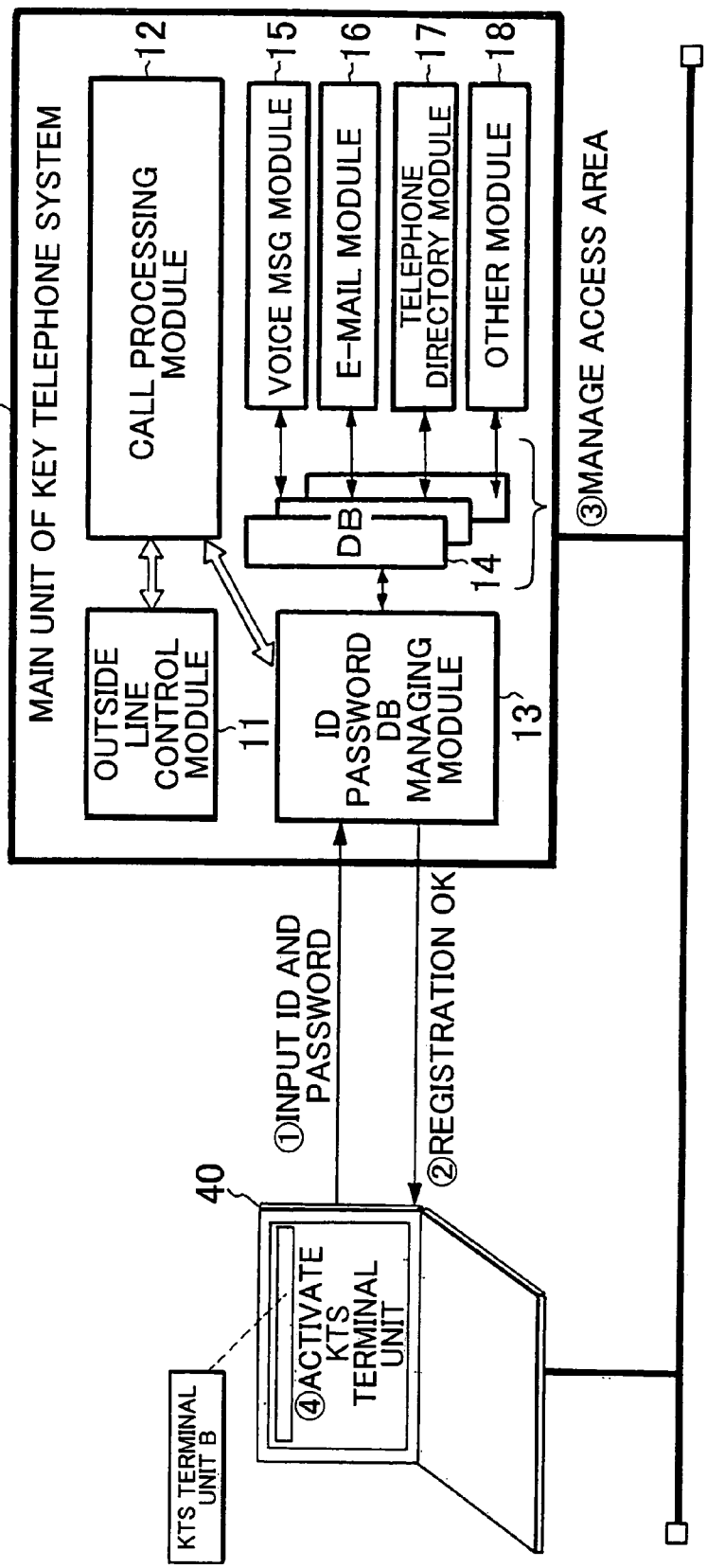
FIG. 2 is a schematic diagram showing a process of which a main unit recognizes a KTS terminal unit.

FIG. 2 shows a process that the main unit recognizes a KTS terminal unit. An ID and a password are input from a KTS terminal unit (B) to the main unit of the key telephone system. When the ID and password match those registered in the main unit of the key telephone system, the main unit recognizes the KTS terminal unit (B). As a result, the KTS terminal unit (B) can communicate as an IP extension terminal unit with another KTS terminal unit in accordance with the VOIP. When the main unit of the key telephone system recognizes the KTS terminal unit, the main unit of the key telephone system turns on presence information of a relevant field of the telephone directory. The presence information represents that the KTS terminal unit can perform an extension call.

Figure 3:
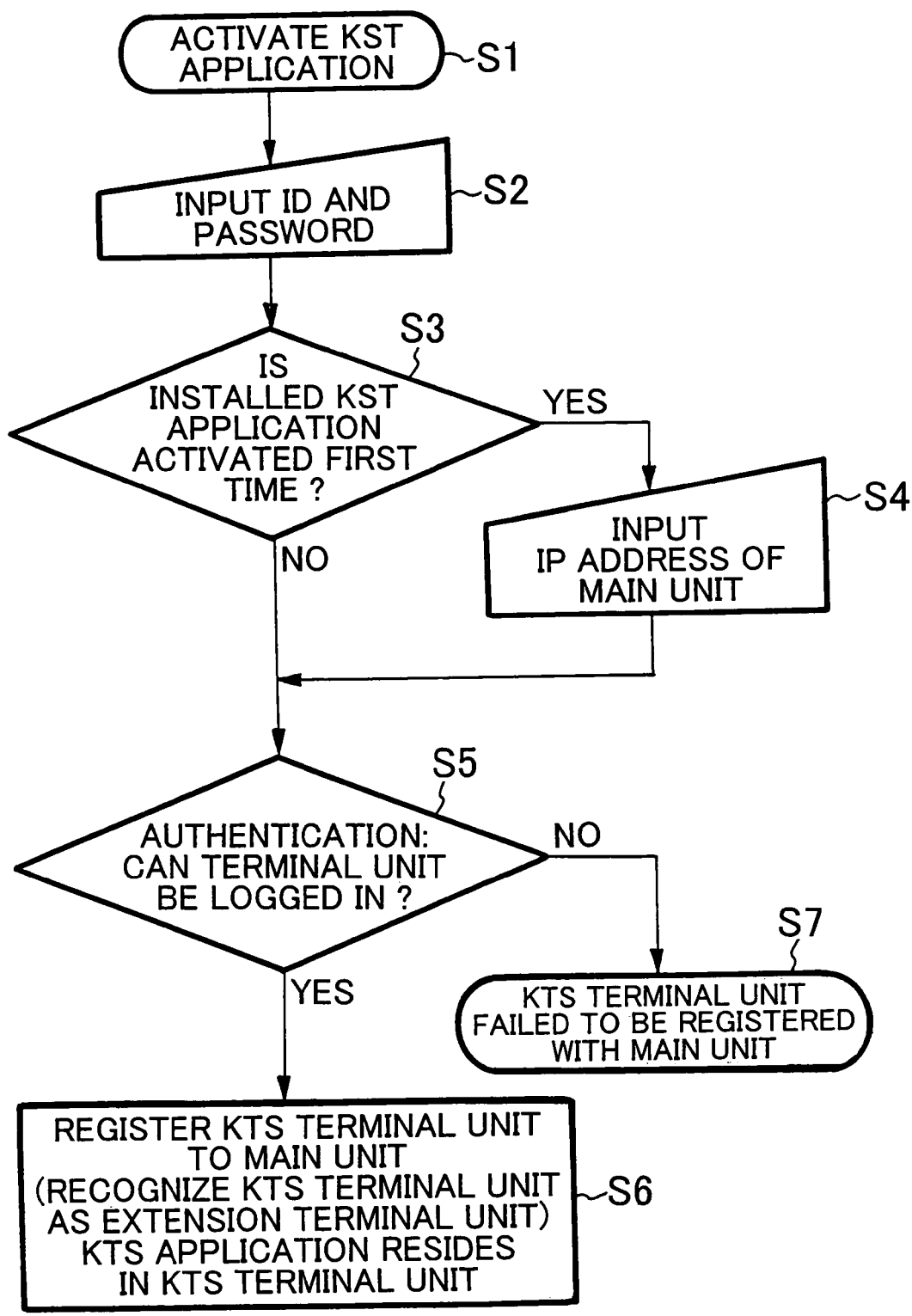
FIG. 3 is a flow chart showing a process of which the main unit recognizes a KTS terminal unit placed outside a company LAN as an IP extension terminal unit.

Next, with reference to FIG. 3, a process in which the KTS terminal unit (A) placed outside the LAN of the key telephone system accesses the main unit of the key telephone system through the IP network (Internet) and the main unit recognizes the KTS terminal unit (A) as an IP extension terminal unit.

Figure 4:
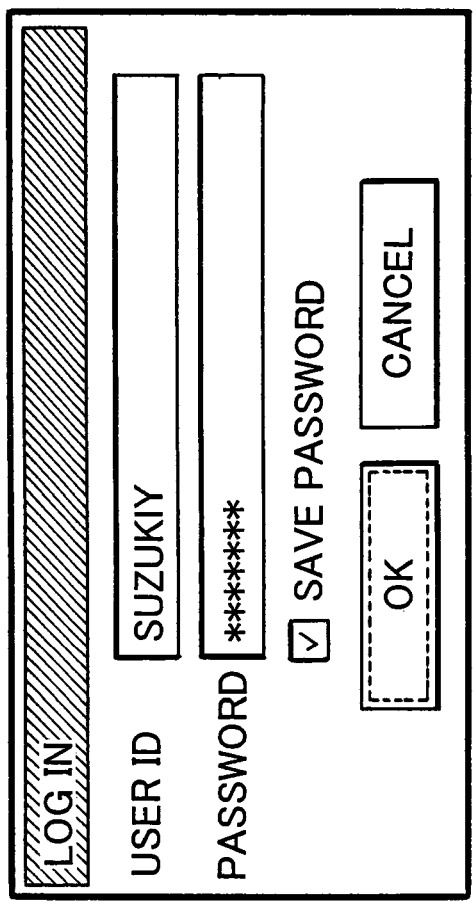
FIG. 4 is a schematic diagram showing an input screen for an ID and a password.

KTS application software installed in the personal computer is started up(at step S1). An ID and a password that have been registered to the main unit are input to the personal computer (at step S2). FIG. 4 shows an input screen for an ID and a password.

Figure 5:
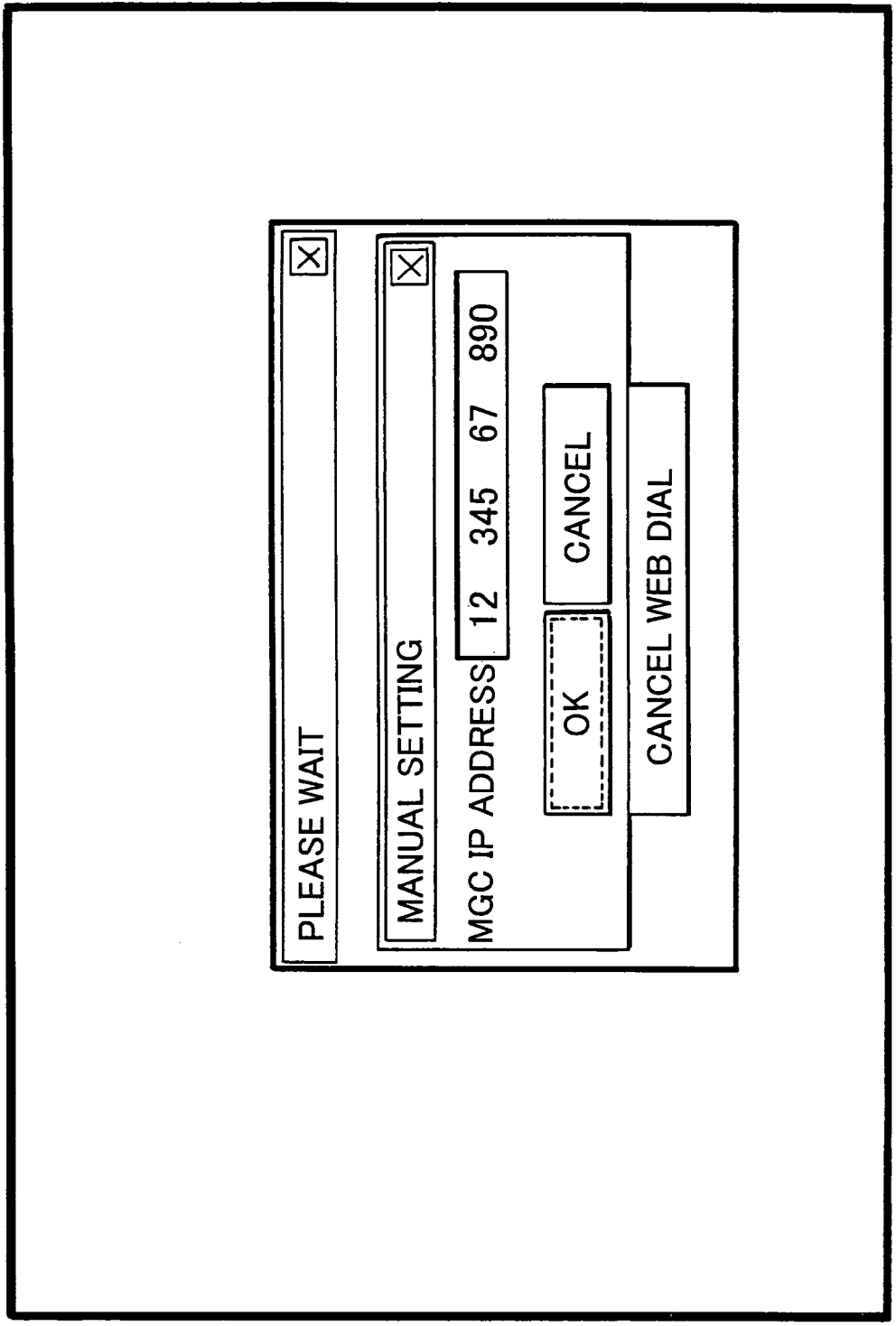
FIG. 5 is a schematic diagram showing an input screen for an IP address.

It is determined whether or not the installed KTS application software is activated first time (at step S3). When the installed KTS application software is activated first time, an IP address of the main unit of the key telephone system is input (at step S4). FIG. 5 shows an input screen for an IP address. Once an IP address is input, since it is stored in a memory of the personal computer, it is not necessary to input the same IP address again.

The ID—password managing module 13 of the main unit of the key telephone system authenticates the input ID and password. When the ID—password managing module 13 does not successfully authenticate the input ID and password (at step S5), it does not permit the KTS terminal unit to log in to the main unit of the key telephone system. In this case, since the ID—password managing module 13 fails to register the KTS terminal unit as an IP extension terminal unit (at step S7). When the ID—password managing module 13 successfully authenticates the input ID and password (at step S5), it permits the KTS terminal unit to log in to the main unit 10 of the key telephone system and registers the KTS terminal unit as an IP extension terminal unit (at step S6). In other words, the KTS application software resides as a KTS terminal unit in the personal computer. As a result, the KTS terminal unit can communicate as an IP extension terminal unit with other KTS terminal units in accordance with the VoIP. In this case, the main unit of the key telephone system turns on the presence information of the relevant field of the telephone directory so as to represent that the KTS terminal unit can perform an extension call.

Figure 6:
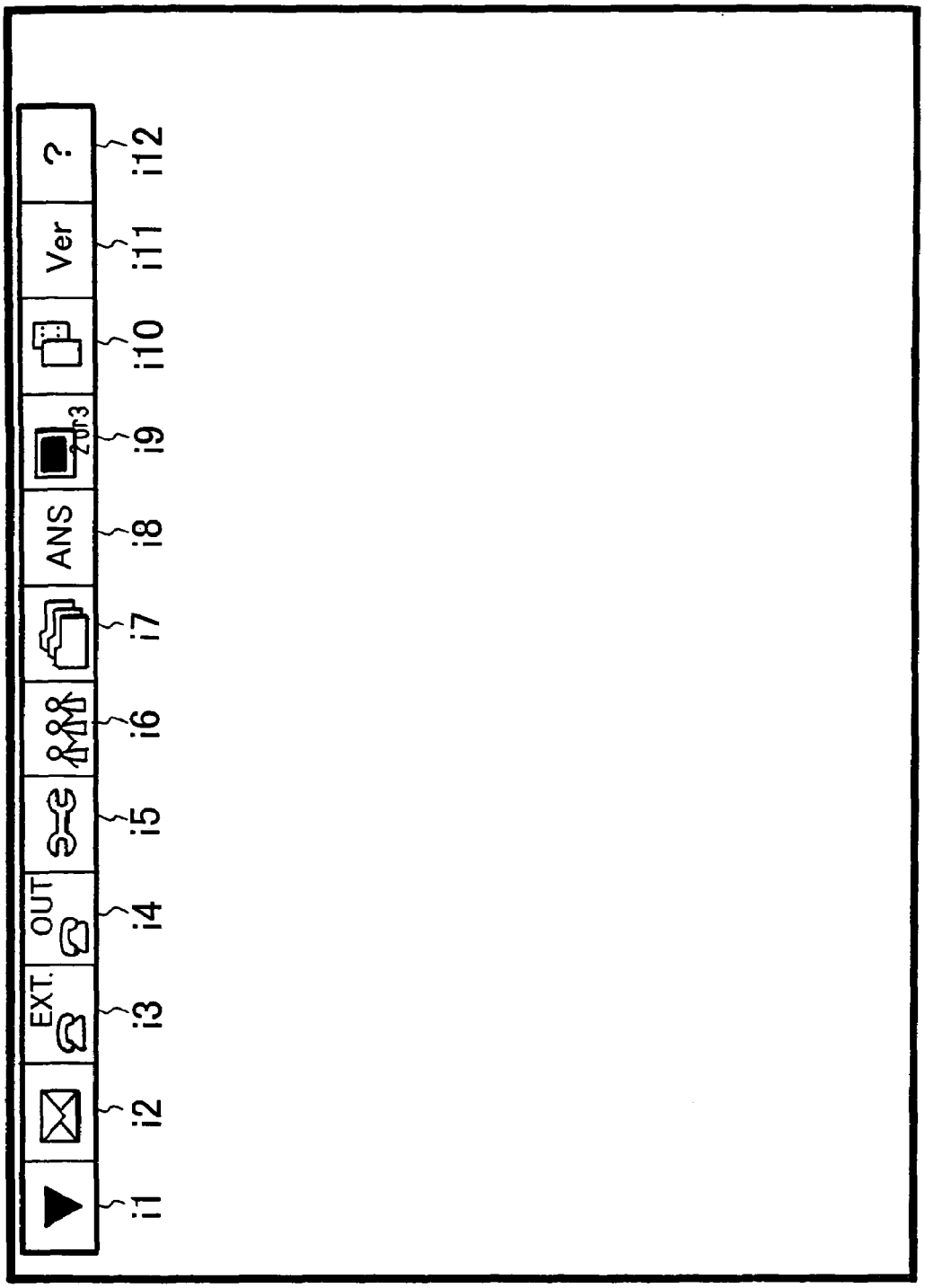
FIG. 6 is a schematic diagram showing an example of a screen displayed by KTS application software.

FIG. 6 shows an example of a screen displayed by the KTS application software. Icons of KTS applications are displayed at an upper portion of the screen so as to operate them with use of word processor software or spread sheet software. An icon i1 is a KTS information screen display icon. An icon i2 is a mail transmission icon. An icon i3 is an extension call making icon. An icon i4 is an outside line mode switching icon. An icon i5 is a setting icon. An icon i6 is a telephone directory icon. An icon i7 is an incoming call history icon. An icon i8 is a response key icon. An icon i9 is a moving picture (video) display icon. An icon i10 is a portal site display icon. An icon i11 is a version display icon. An icon i12 is a help icon.

Figure 7:
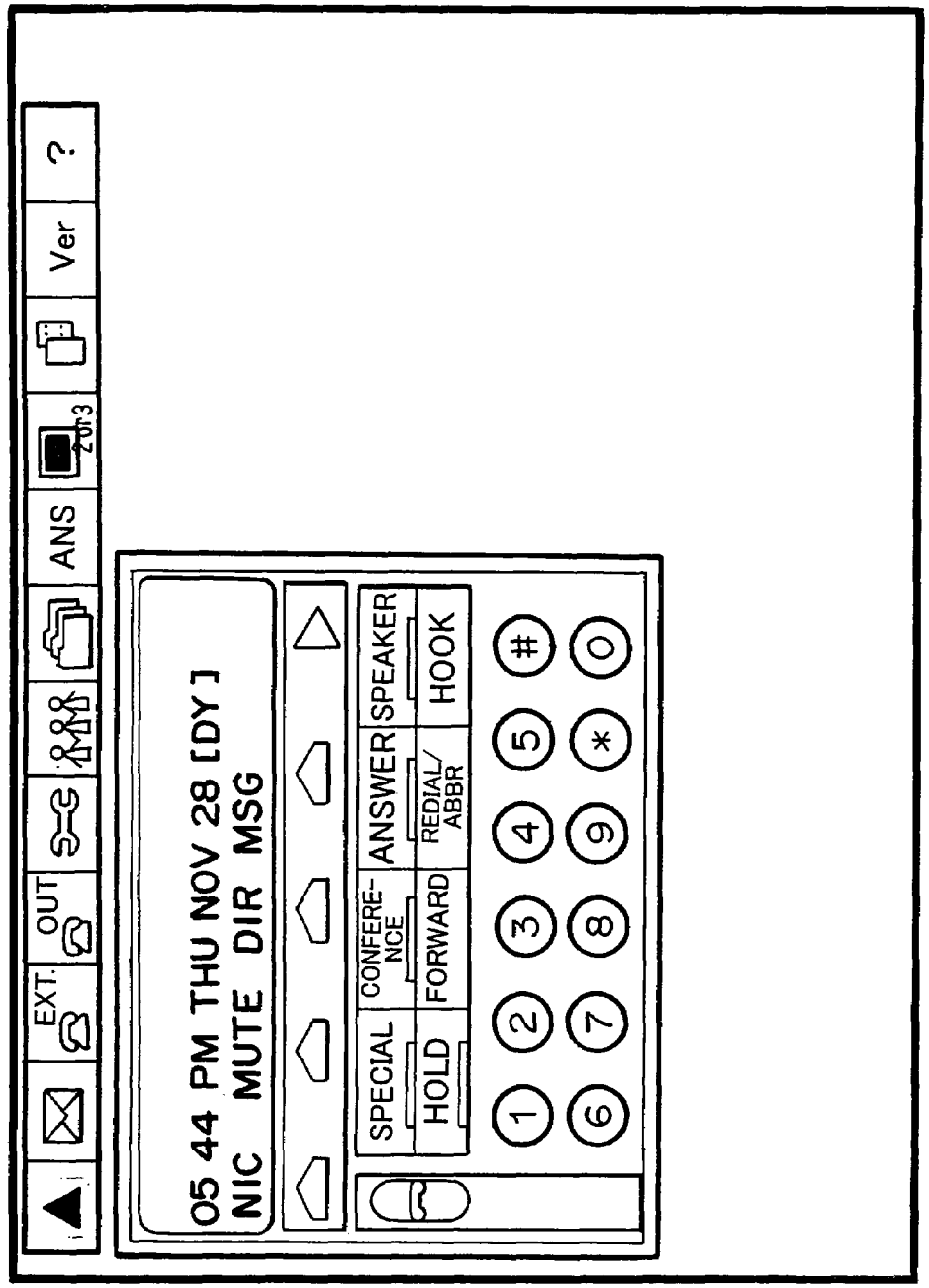
FIG. 7 is a schematic diagram showing an example of a display and operation screen on which an IP extension terminal unit operates.

When the icon i1 is clicked, a display and operation screen as shown in FIG. 7 that operates the KTS terminal unit as an IP extension terminal unit is pulled down. When a telephone number is input, numeric buttons are clicked.

Figure 8:
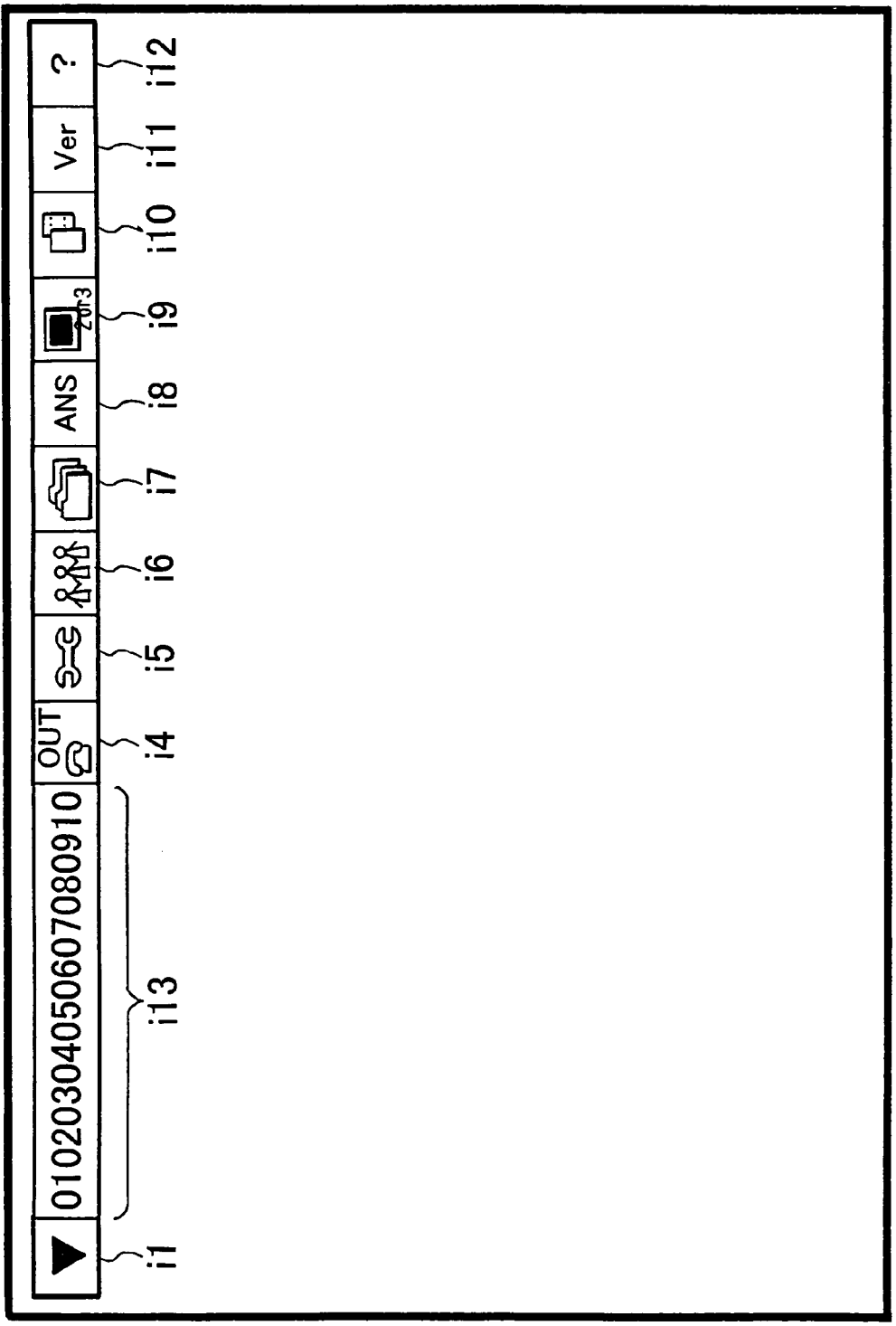
FIG. 8 is a schematic diagram showing an example of a display screen of an outside line selection icon block.

When the icon i4 is clicked, an outside telephone number selecting icon i13 is displayed as shown in FIG. 8. Any one of outside telephone lines 01 to 10 can be selected and a telephone call can be made to the selected telephone number.

Figure 9:
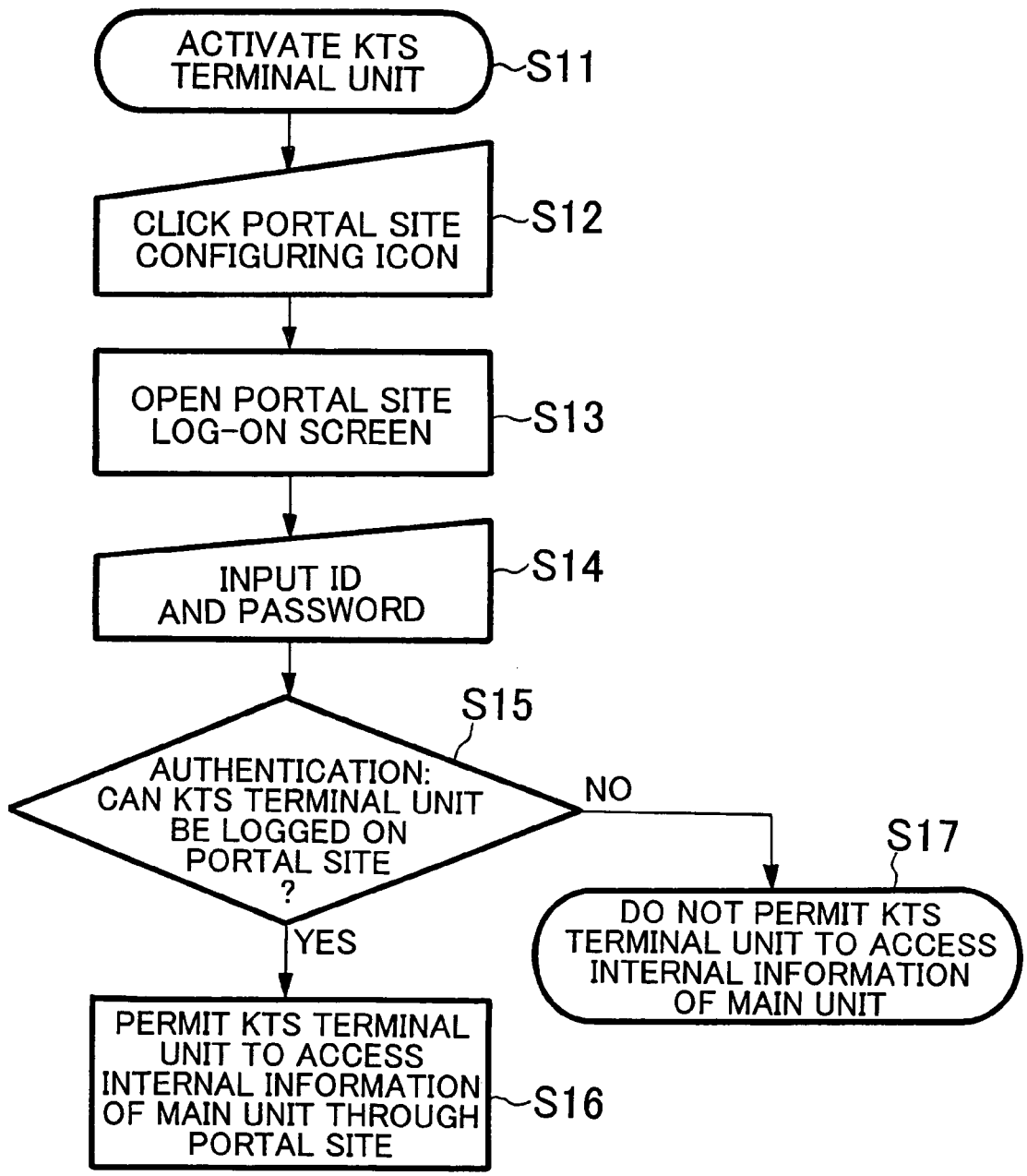
FIG. 9 is a flow chart showing a process in which a KTS terminal unit placed outside the LAN configures a portal site.

Next, with reference to FIG. 9, a process for configuring a portal site through which the KTS terminal unit (A) placed outside the LAN of the key telephone system accesses information stored in the database of the main unit of the key telephone system will be described.

Figure 10:
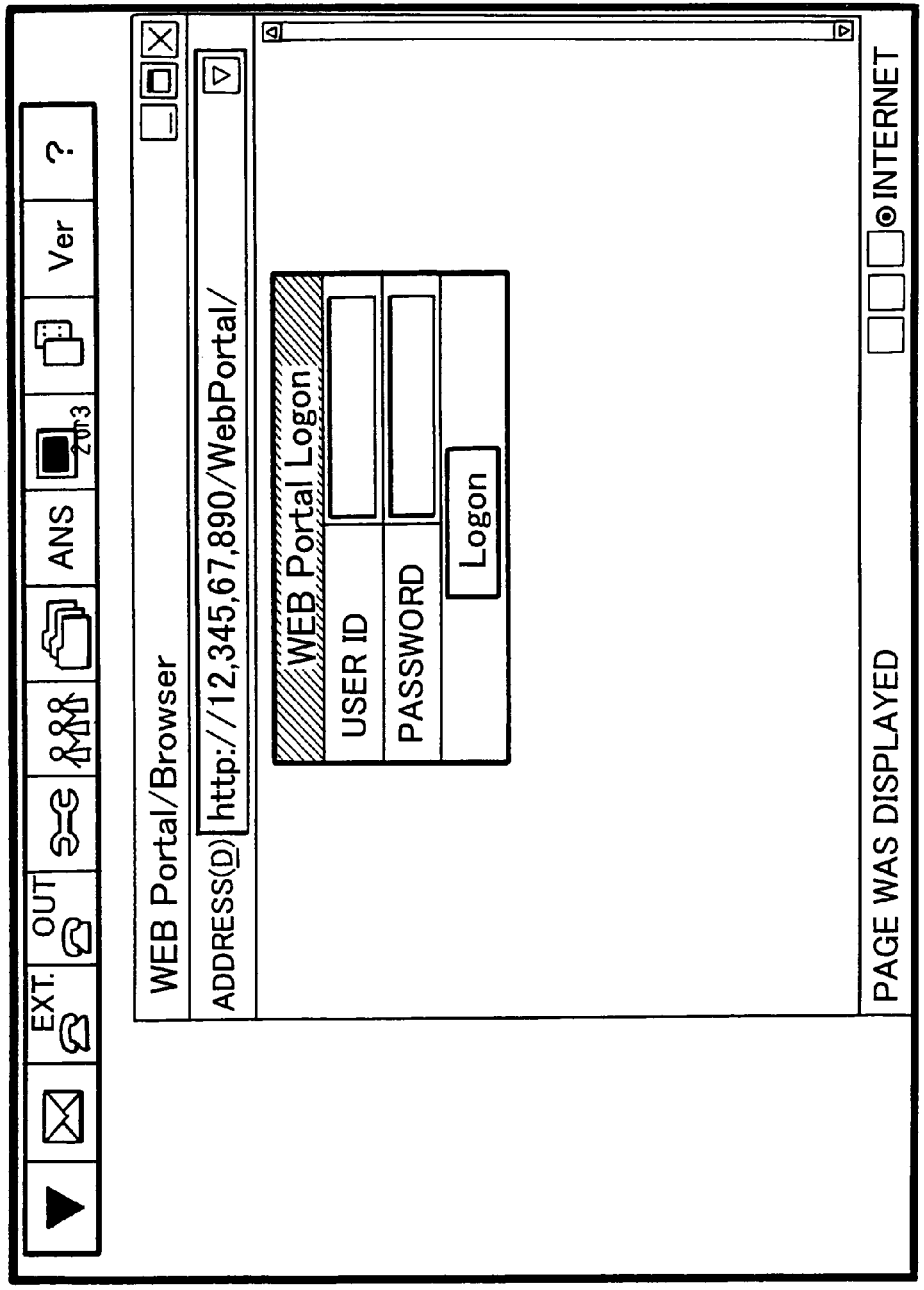

After the KTS application software has been executed, a screen shown in FIG. 6 is displayed (at step S11). On the screen shown in FIG. 6, when the portal site configuring icon i10 is clicked (at step S12), a portal site log-on screen shown in FIG. 10 is displayed. An ID and a password that have been registered to the main unit are input and a "Log On" button is clicked. The ID and password may be the same as those that have been input when the KTS application software has been started up. Alternatively, different ID and the password may be used.

The ID—password managing module 13 does not successfully authenticated the ID and password, it does not permit the KTS terminal unit to log on to the main unit (at step S15). The ID—password managing module 13 does not permit the KTS terminal unit to access information stored in the database (at step S17). When the ID—password managing module 13 successfully authenticates the ID and password (at step S15), it permits the KTS terminal unit to access information of the database (at step S16) and transmits web portal menu information to the KTS terminal unit.

Figure 11:
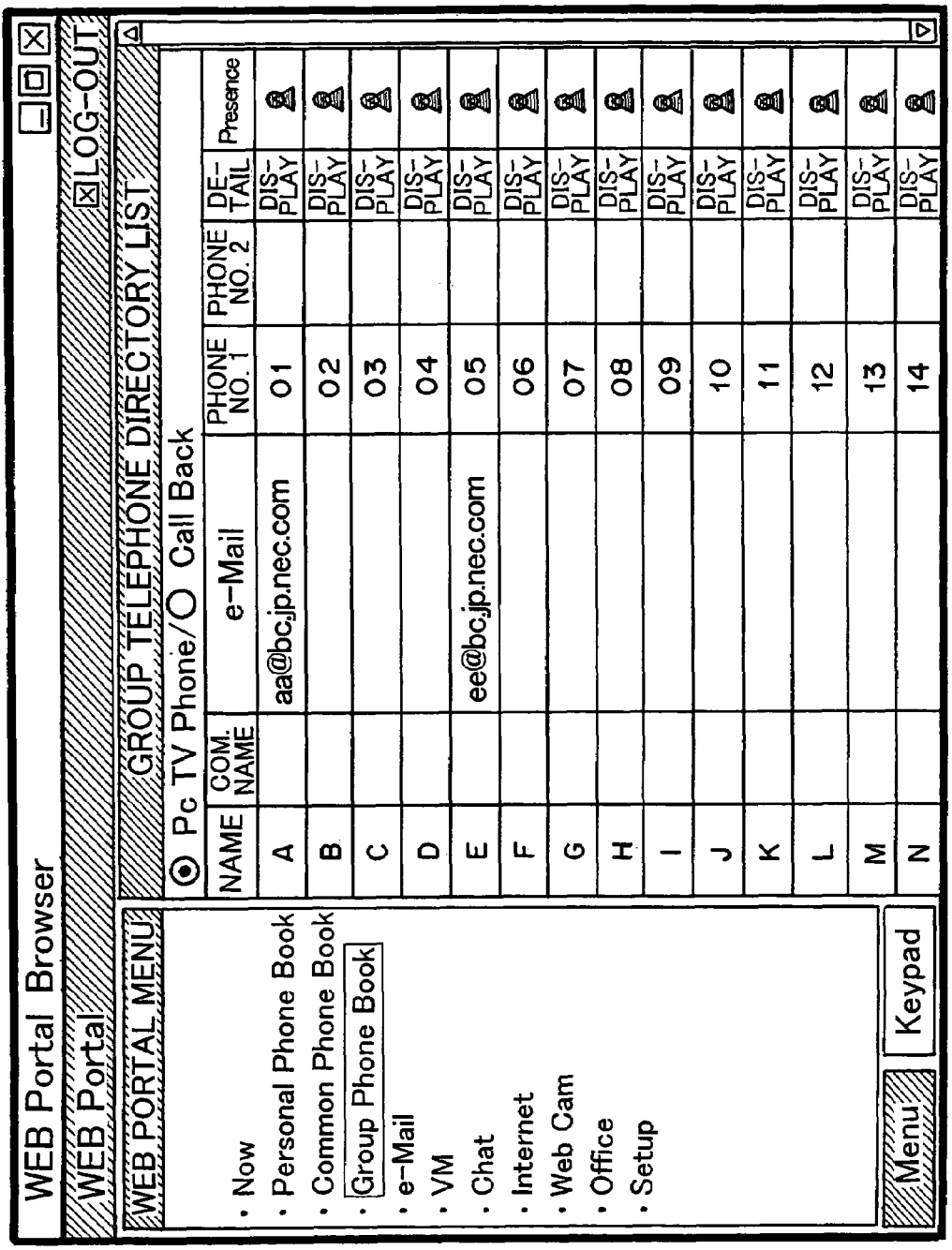
FIG. 11 is a schematic diagram showing an example of a display screen of a web portal menu.

When the KTS terminal unit (A) is permitted to log on to the main unit of the key telephone system, a web portal menu shown on the left side of FIG. 11 is displayed. When a menu item "Group Phone Book" is selected, a menu item "group telephone list" is displayed on the right side of the screen shown in FIG. 11. A menu item "Presence" represents that the relevant KTS terminal unit can perform an extension call. When the KTS terminal unit logs out the main unit, a menu item "Log out" displayed at an upper right portion of the screen is clicked.

Next, menu items of the web portable menu shown on the left side of the screen shown in FIG. 11 will be described. A menu item "Now" displays a list of e-mail. A menu item "Personal Phone Book" displays a personal telephone directory. A menu item "Common Phone Book" displays a common telephone directory. A menu item "Group Phone Book" displays a group telephone directory. "e-Mail" displays a list of e-Mail. A menu item "VM" checks a voice message. A menu item "Chat" performs a chat. A menu item "Internet" connects the KTS terminal unit to the Internet. A menu item "Web Cam" links a picture of a web video camera (a video camera that has a function for publishing a picture to the Internet). A menu item "Office" displays a hard disk folder of the main unit. A menu item "Setup" displays a setting screen on the main unit side.

Figure 12:
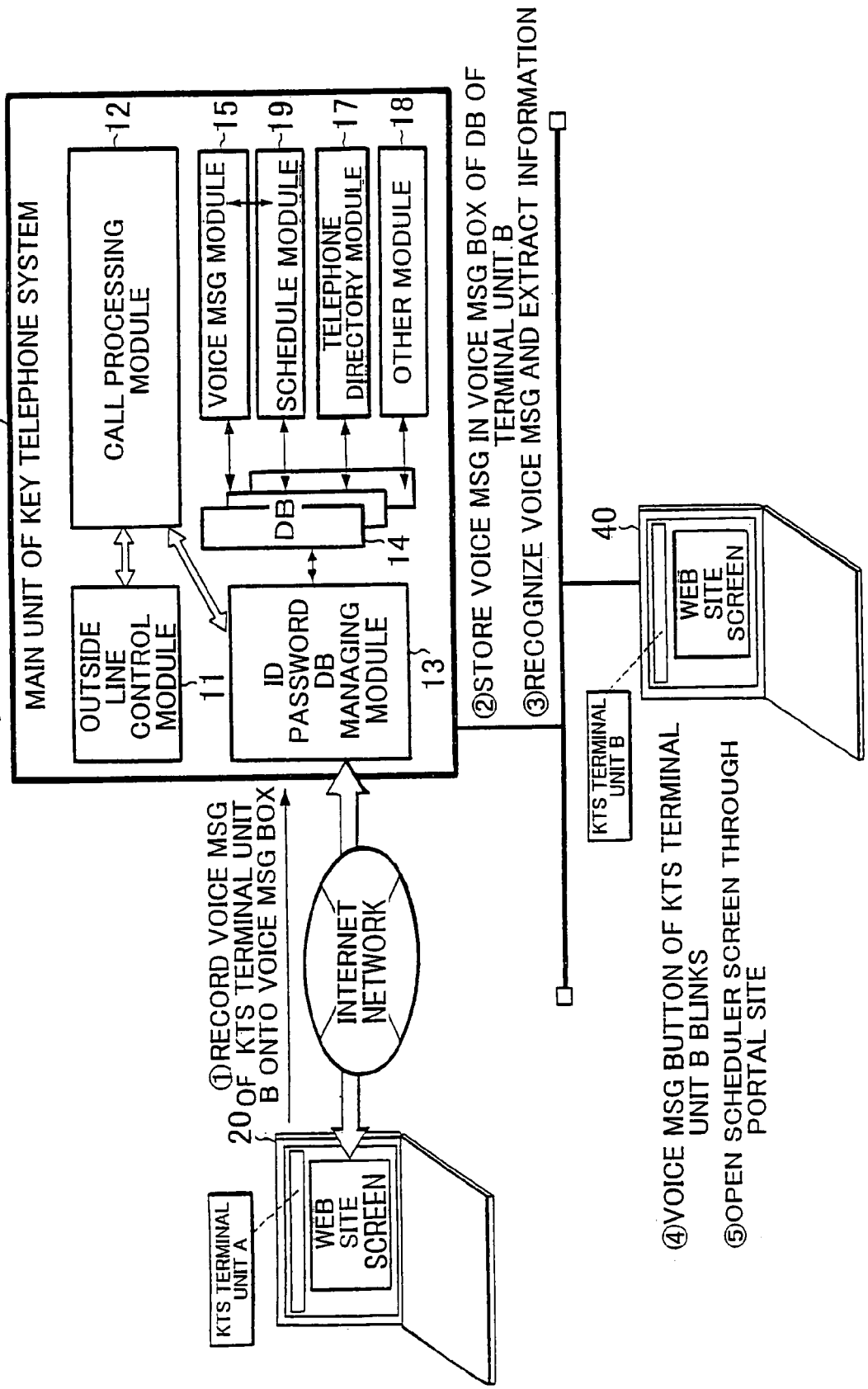
FIG. 12 is a structural schematic diagram describing a process for operating a voice message and a scheduler.

FIG. 12 is a structural schematic diagram describing a process in which the database of the main unit of the key telephone system is accessed and a voice message and a scheduler are operated in the state of the portal site being logged on.

Figure 13:
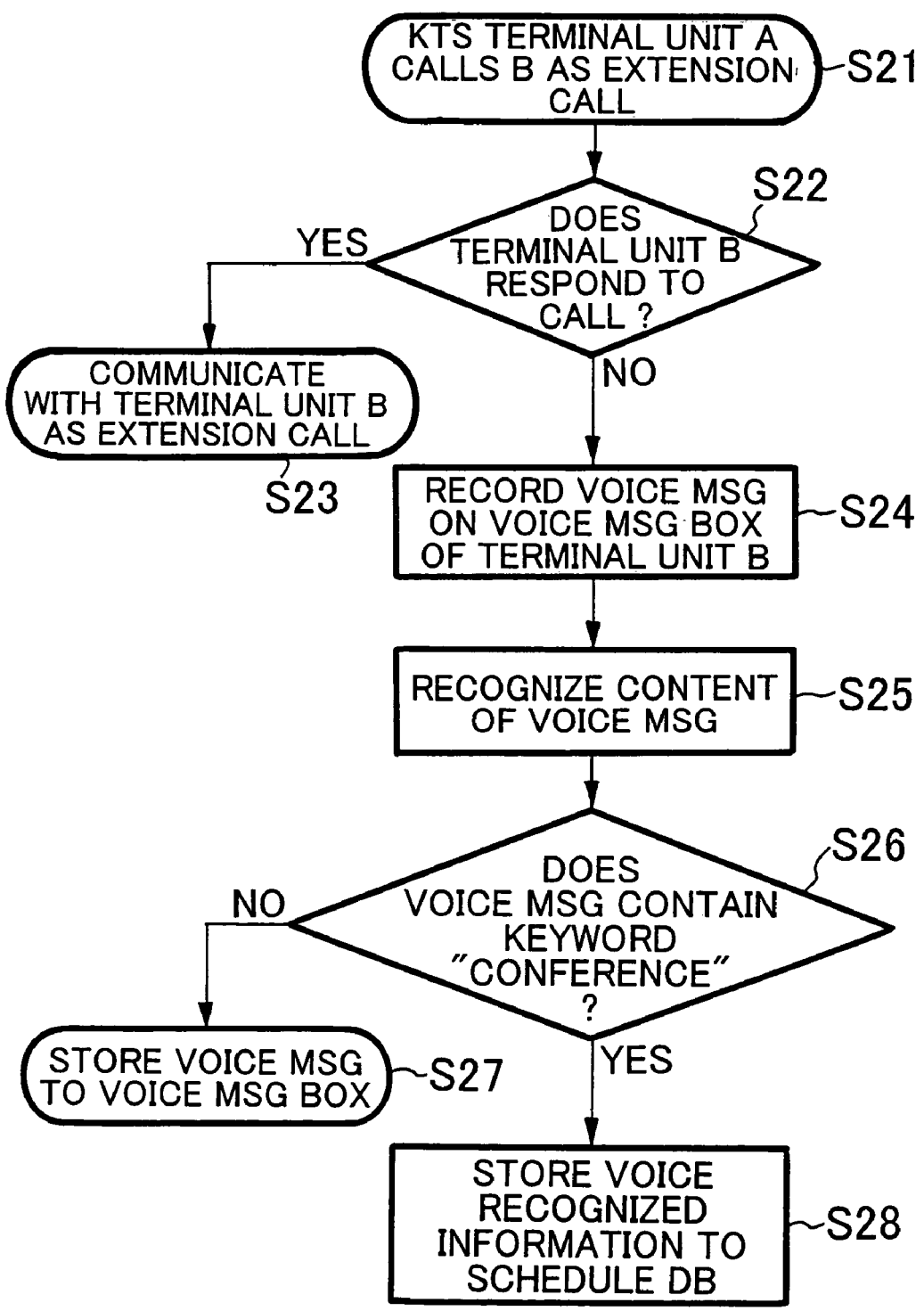
FIG. 13 is a flow chart in the case that a KTS terminal unit (A) placed outside the LAN accesses a KTS terminal unit (B) placed inside the LAN.

Next, with reference to FIG. 13, as an example of such a process, the case that the KTS terminal unit (B) inside the LAN of the key telephone system is accessed from the KTS terminal unit (A) placed outside the LAN through the IP network will be described.

First, the KTS terminal unit (A) calls the KTS terminal unit (B) as an extension call (at step S21). When the KTS terminal unit (B) responses to the call from the KTS terminal unit (A) (at step S22), the KTS terminal unit (A) communicates with the KTS terminal unit (B) as an IP extension terminal unit (at step S23). When the KTS terminal unit (B) does not respond to the call from the KTS terminal unit (A) (at step S22), a voice message from the KTS terminal unit (A) is recorded to a voice message box of the database of the main unit of the key telephone system (at step S24). The main unit of the key telephone system recognizes the content of the voice message (at step S25) and determines whether the content contains a keyword "conference"(at step S26). When the content does not contain the keyword "conference", the main unit stores the voice message to the voice message box (at step S27). When the voice message contains the keyword "conference", the main unit of the key telephone system stores voice recognized information to a schedule database (at step S28).

Figure 14:
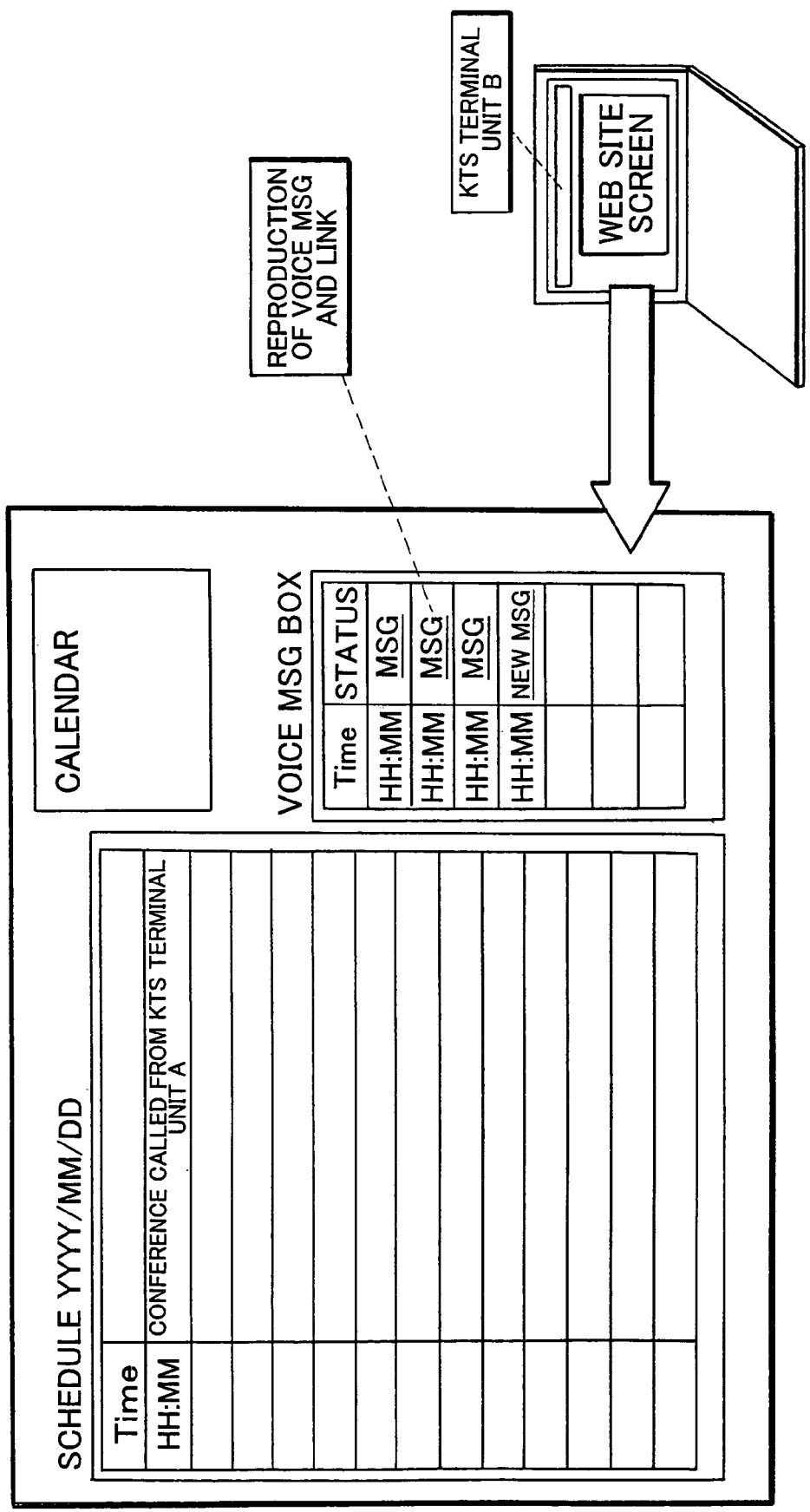
FIG. 14 is a schematic diagram showing an example of a display screen of a schedule.

FIG. 14 shows an example of a schedule screen display. The schedule screen shows a conference called by the KTS terminal unit (A).

Next, with reference to FIG. 15 and FIG. 16, the cases where the KTS terminal unit (B) opens the schedule screen and the voice message screen will be described.

When the KTS terminal unit (B) opens the schedule screen (at step S31), the KTS terminal unit (B) determines whether or not there is any schedule (at step S32). When there is no schedule, the KTS terminal unit (B) exits the process (at step S33). When there is any schedule, the KTS terminal unit (B) determines whether or not the schedule is a voice recognized schedule (at step S34). When the schedule is not a voice recognized schedule, the KTS terminal unit (B) displays the schedule (at step S35). When the schedule is a voice recognized schedule, the KTS terminal unit (B) displays a linked menu item "MSG Received" in the voice message box displaying section on the schedule screen and links the recorded voice message (at step S36).

When the KTS terminal unit (B) opens the voice message screen (at step S41), the KTS terminal unit (B) determines whether there is any voice message (at step S42). When there is no voice message, the KTS terminal unit (B) exits the process (at step S43). When there is any voice message, the KTS terminal unit (B) determines whether or not the voice message contains a keyword "conference"(at step S44). When the voice message does not contain the keyword "conference", the KTS terminal unit (B) displays a menu item "Voice Message Recorded"(at step S45). When the voice message contains the keyword "conference", with the schedule screen link button clicked, the message is registered to the schedule database (at step S46).

Next, with reference to FIG. 17, function of an electronic bulletin board will be described. An electronic bulletin board describes speaker names, messages, and speakers'extension telephone numbers. As the KTS terminal unit (A) placed outside the LAN of the key telephone system logs on to the portal site, the KTS terminal unit (A) accesses the electronic bulletin board, and is able to post a message thereon.

Next, a method for retrieving internal information of the main unit will be described in brief. A portal site is configured in a KTS terminal unit. With an ID, a password, and so forth, various kinds of information can be retrieved regardless of the location of the KTS terminal unit. Even if the KTS terminal unit is placed outside the company or office, the KTS terminal unit can retrieve mail information, voice message information, movie message information, telephone directory information, and business document information. In addition, the KTS terminal unit can transmit a document to a remote party that the terminal unit has called. In addition, the KTS terminal unit can reference a scheduler stored in the main unit of the key telephone system.

A voice message stored in the main unit of the key telephone system is voice recognized and registered to the scheduler database of the main unit. The KTS terminal unit placed outside the company or office can reference the scheduler stored in the main unit and retrieve voice messages through the scheduler.

When a chat site that is in cooperation with a telephone function is configured in the KTS terminal unit, even if the KTS terminal unit is placed outside the company or office, the KTS terminal unit can exchange short messages such as chats with member in the company. As a result, the KTS terminal unit can exchange information with member in the company on real time.

When a BBS site that is in cooperation with the telephone function is configured in the KTS terminal unit, messages can be promptly exchanged with member in the company. The KTS terminal unit placed outside the company or office can exchange messages with member in the company on the BBS. Thus, information can be published to member in the company. For example, the user of the KTS terminal unit can call a person who posted a message on the BBS.

When a chat site or a document site that is in cooperation with the telephone function is configured in the KTS terminal unit, the user can send a file to a remote party whom he or she is calling. With the KTS terminal unit placed outside the company or office, the user can transfer a file to a member in the company.

When presence information is stored in each KTS terminal unit, another KTS terminal unit can determine whether or not it can call another KTS terminal units. As a result, even if the user of the KTS terminal unit is outside the company or office, he or she can retrieve presence information corresponding to member in the company.

As described above, according to the present invention, since the KTS terminal unit placed outside the LAN accesses the main unit of the key telephone system through the IP network, even if the user is outside the company or office, with a web environment, he or she can use services that the main unit of the key telephone system provides through the portal site in the KTS terminal unit as if he or she were in the company.

In other words, the user can retrieve mail information, voice message information, movie message information, telephone directory information, and business document information from the database of the main unit. In addition, the KTS terminal unit can be in cooperation with the scheduler. Thus, the user can non-voice communicate with member in the company on real time.

In addition, the KTS terminal unit can send and receive a short message such as a chat to member in the company and exchange BBS messages with them on the BBS. In addition, the KTS terminal unit can forward a file to member in the company. In addition, the KTS terminal unit can check whether or not the member in the company can receive extension calls.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An outside-LAN (Local Area Network) connectable IP (Internet Protocol) key telephone system, comprising:
a key telephone system main unit, configured to accommodate a plurality of IP extension terminal units, for switching calls with outside lines; and
a key telephone system terminal unit, disposed outside the LAN, for accessing the key telephone system main unit through an IP network and for functioning as an IP extension terminal unit,
wherein said key telephone system terminal unit comprises:
log-in means for logging in to an IP address of the key telephone system main unit with predetermined first ID and password,
wherein said key telephone system main unit comprises:
means for authenticating the first ID and password received from the key telephone system terminal unit, registering the key telephone system terminal unit as an IP extension terminal unit, and allowing the key telephone system terminal unit to voice communicate with another IP extension terminal unit in accordance with the Voice over Internet Protocol (VoIP) without allowing the key telephone system terminal unit to access directory information in a database in the key telephone system main unit,
wherein said key telephone system terminal unit registered as an IP extension terminal unit with the key telephone system main unit further comprises,
log-on means for logging on to the key telephone system main unit with predetermined second ID and password, and
means for displaying a portal site for accessing information stored in the database, when the log-on means has logged on to the key telephone system terminal unit, and
wherein said key telephone system main unit further comprises,
means for authenticating the second ID and password received from the key telephone system terminal unit and permitting the key telephone system terminal unit to access the directory information stored in the database.

2. The outside-LAN connectable IP key telephone system as set forth in claim 1,
wherein said database stores a telephone directory list of users of the extension terminal units, the telephone directory list including presence information which represents whether or not each of the extension terminal units is able to perform an extension call to the other extension terminal units, and
wherein the presence information of the key telephone system terminal unit registered as an IP extension terminal unit is turned on.

3. The outside-LAN connectable IP key telephone system as set forth in claim 1,
wherein said key telephone system main unit is configured to store information including voice messages, electronic mail, and telephone directory data in the database.

4. A key telephone system terminal unit, placed outside a LAN, for accessing through an IP network a key telephone system main unit configured to accommodate a plurality of IP extension terminal units and to switch calls to outside lines, and for functioning as an IP extension terminal unit, the key telephone system terminal unit comprising:
log-in means for logging in to an IP address of the key telephone system main unit with predetermined first ID and password,
wherein said key telephone system terminal unit is configured to be authenticated by the key telephone system main unit with the first ID and password, be registered as an IP extension terminal unit, and be allowed to voice communicate with another IP extension terminal units in accordance with the VoIP without allowing the key telephone system terminal unit to access directory information in a database in the key telephone system main unit,
wherein said key telephone system terminal unit that has been registered as an IP extension terminal unit with the key telephone system main unit further comprises,
log-on means for logging on to the key telephone system main unit with predetermined second ID and password, and
means for displaying a portal site for accessing information stored in the database, when the log-on means has logged on to the key telephone system terminal unit, and
wherein said key telephone system terminal unit is configured to be authenticated by the key telephone system main unit with the second ID and password and to access information stored in the database.

5. A key telephone system main unit of an outside-LAN connectable key telephone system, configured to accommodate a plurality of IP extension terminal units, for switching calls with outside lines, the key telephone system main unit comprising:
means, accessed by a key telephone system terminal unit which is placed outside a LAN through an IP network and which functions as an IP extension terminal unit, for authenticating the key telephone system terminal unit with predetermined first ID and password, for permitting the key telephone system terminal unit to log in to the key telephone system main unit, for registering the key telephone system terminal unit as an IP extension terminal unit, and for allowing the key telephone system terminal unit to voice communicate with another IP extension terminal units in accordance with the VoIP without allowing the key telephone system terminal unit to access directory information in a database in the key telephone system main unit, and means for authenticating the key telephone system terminal unit registered as an IP extension terminal unit with predetermined second ID and password, for permitting the key telephone system terminal unit to log on to the IP key telephone system main unit, and for permitting the key telephone system terminal unit to access the directory information stored in the database.

6. A method for causing a key telephone system terminal unit placed outside a LAN to access, through an IP network, a key telephone system main unit which is configured to accommodate a plurality of IP extension terminal units and to switch calls with outside lines, and for permitting the key telephone system terminal unit to function as an IP extension terminal unit, comprising the steps of:

the key telephone system terminal unit logging in to an IP address of the key telephone system main unit with predetermined first ID and password;

the key telephone system main unit authenticating the key telephone system terminal unit with the first ID and password, registering the key telephone system terminal unit as an IP extension terminal unit, and allowing the key telephone system terminal unit to voice communicate with another IP extension terminal units in accordance with the VoIP without allowing the key telephone system terminal unit to access directory information in a database in the key telephone system main unit;

after the key telephone system terminal unit has been registered as an IP extension terminal unit with the key telephone system main unit, logging the key telephone system terminal unit on to the key telephone system main unit with predetermined second ID and password;

the key telephone system main unit authenticating the key telephone system terminal unit with the second ID and password and permitting the key telephone system terminal unit to access the directory information stored in the database; and after the key telephone system terminal unit has been permitted to access the directory information, the key telephone system terminal unit displaying a portal site for accessing information stored in the database.

* * * * *